Figure 1:
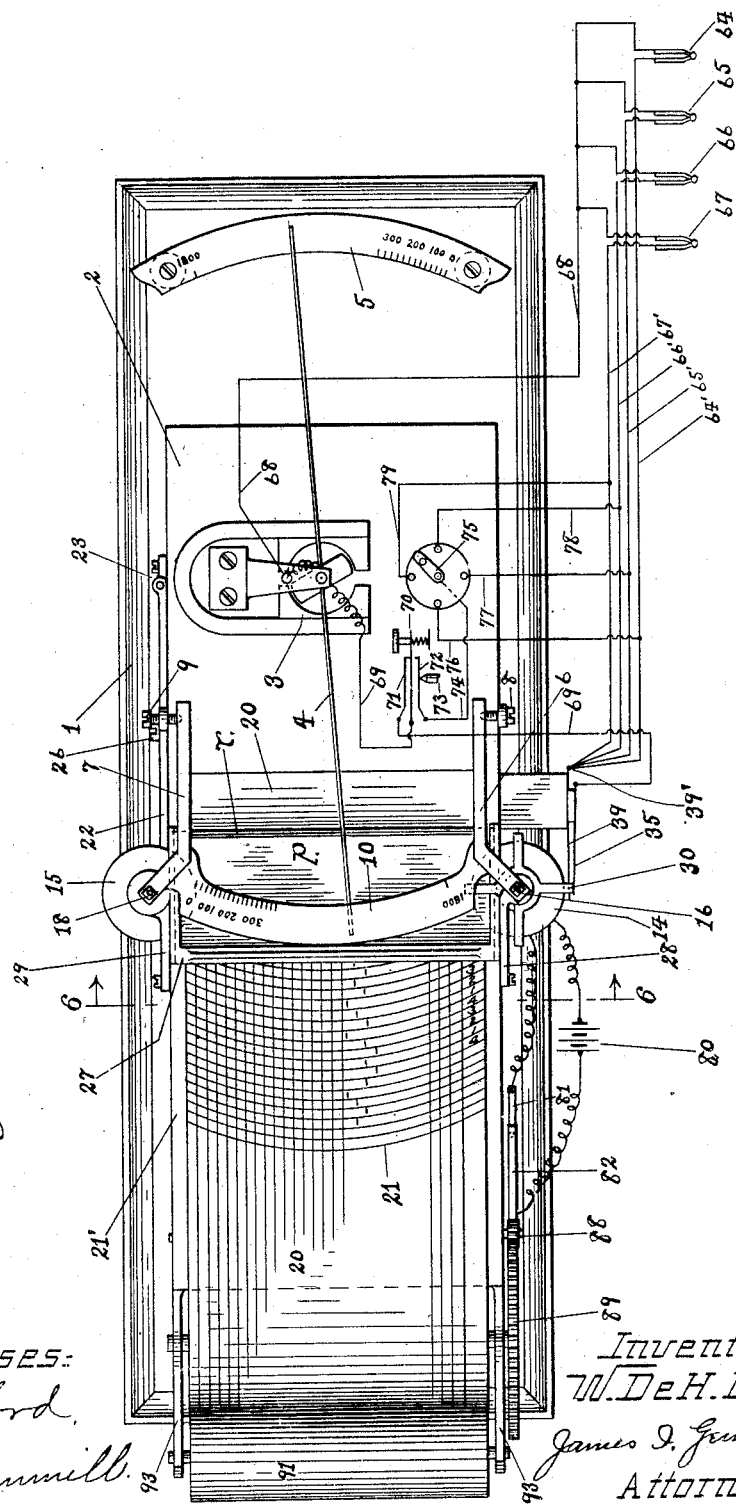

W. DE H. LEE.
RECORDING PYROMETER OF THE THERMO-ELECTRIC TYPE.
APPLICATION FILED NOV. 25, 1908.

963,908.

Patented July 12, 1910.

5 SHEETS—SHEET 1.

Witnesses:
A. L. Lord.
L. M. Gemmill.

Inventor.
W. De H. Lee.
James I. Gemmill.
Attorney.

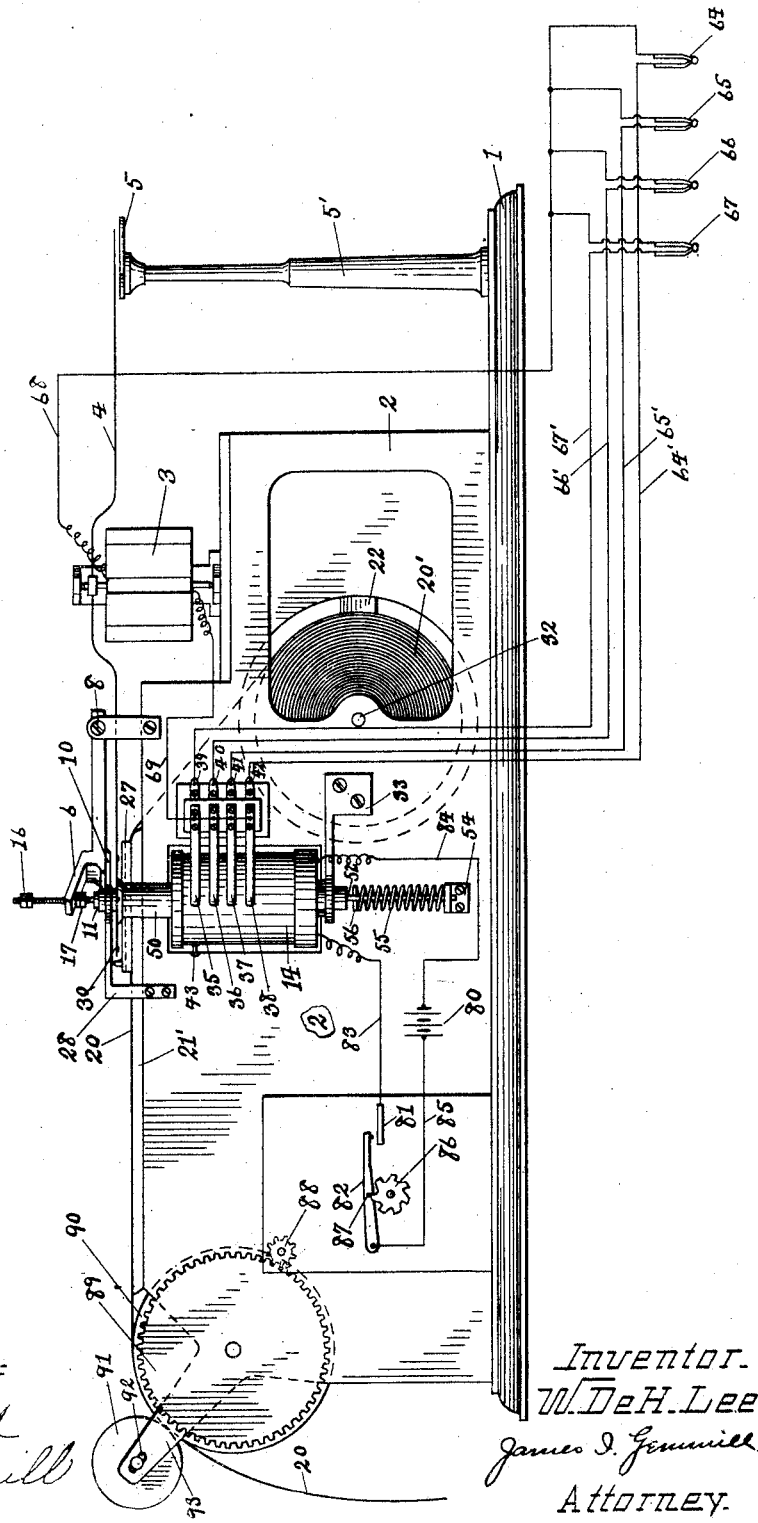

W. DE H. LEE.
RECORDING PYROMETER OF THE THERMO-ELECTRIC TYPE.
APPLICATION FILED NOV. 25, 1908.
963,908.
Patented July 12, 1910.
5 SHEETS—SHEET 3.
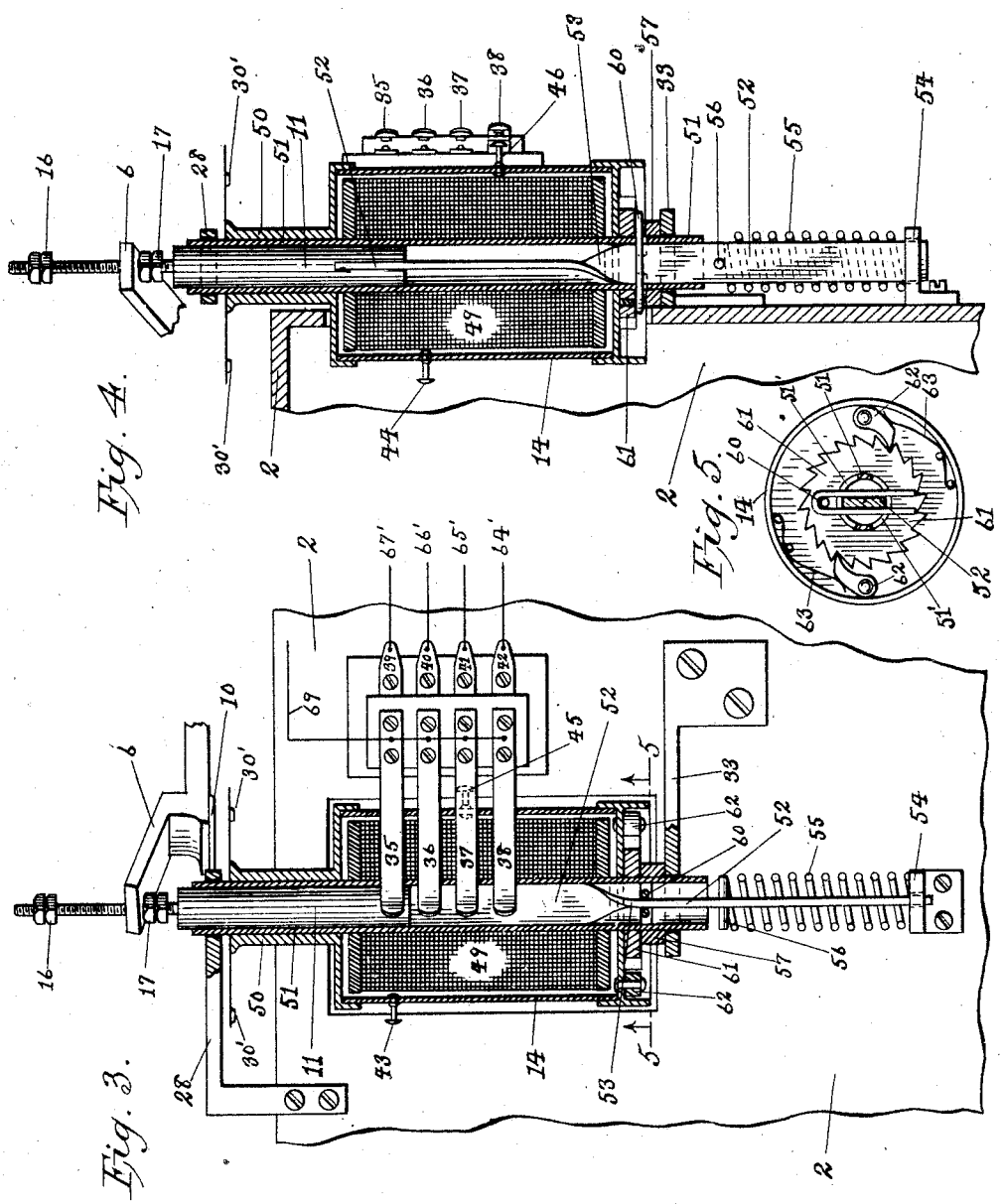

W. DE H. LEE.
RECORDING PYROMETER OF THE THERMO-ELECTRIC TYPE.
APPLICATION FILED NOV. 25, 1908.

963,908.

Patented July 12, 1910.
5 SHEETS—SHEET 4.

Witnesses:
A. L. Lord.
L. M. Gemmill.

Inventor.
W. DeH. Lee.
James I. Gemmill
Attorney.

W. DE H. LEE.
RECORDING PYROMETER OF THE THERMO-ELECTRIC TYPE.
APPLICATION FILED NOV. 25, 1908.

963,908.

Patented July 12, 1910.

5 SHEETS—SHEET 5.

Witnesses:
A. L. Lord.
L. M. Gemmill.

Inventor.
W. De H. Lee.
James D. Gemmill.
Attorney.

UNITED STATES PATENT OFFICE.

WALKER DE H. LEE, OF CLEVELAND, OHIO.

RECORDING-PYROMETER OF THE THERMO-ELECTRIC TYPE.

963,908. Specification of Letters Patent. Patented July 12, 1910.

Application filed November 25, 1908. Serial No. 464,442.

*To all whom it may concern:*

Be it known that I, WALKER DE H. LEE, a citizen of the United States, residing at Cleveland, in the county of Cuyahoga and State of Ohio, have invented certain new and useful Improvements in Recording-Pyrometers of the Thermo-Electric Type, of which the following is a specification.

There are two general methods of measuring thermal conditions or temperature electrically. One is known as "electrical-resistance" and the other as "thermo-electric" pyrometry.

My invention relates to the latter, or more specifically speaking, to the "thermocouple" type of pyrometers.

This invention is applicable to furnaces of various kinds, or it may be used where it is desired to indicate the temperature of several distant points and make a record of the said indications for future reference. Pyrometers of this class usually consist, (outside of the instrument, proper,) of a thermocouple electrically connected to the instrument, and located in a position within the heated area which it is desired to indicate; this thermocouple is made in a number of different styles and shapes, all after the accepted form more or less, and generally considered, consisting of a pair of wires of dissimilar metals, and parallel but insulated from each other except at their nether extremities, where they form a juncture with each other by means of,—in practice—a spherical bodied portion of metal similar to one of the said metal wires; these wires, for the extremely high temperatures, are usually of platinum for the one and an alloy of platinum and rhodium for the other. When this couple is heated, a very sluggish voltaic current is generated therein, and of an electro-motive force which is proportioned to the degree of heat to which the said couple is subjected; the force of this current, known as the "couple" current is conveyed to a galvanometer external to the heated area before mentioned, by a pair of ordinary copper wires which are connected as between the said galvanometer and the free ends of the said "couple". The force of this said current is indicated upon the galvanometer, which, being suitably calibrated will give accurate readings of the exact temperature of the heated area to which the said "couple" is subjected.

The general object of this my invention, is to provide a simple and reliably cheap instrument of this character which is adapted to take the temperature readings not alone of one point, but of a plurality of different points and in such a way that the said indications will become a matter of record synchronal with the indications of the said galvanometer, and in a serial manner with regard to each other; at the same time I have produced a mechanism which may be manually operated so that any "couple" may be made to give its reading independent of the usual automatic action of the instrument and without militating in the least with the recording portion thereof.

Another object of my invention is to provide an instrument whereby a thermal record may be had on an ever-moving strip of paper, actuated by a clockwork mechanism in a clock-wise manner; said record being made at different and stated, beforedetermined times and positions on the said paper strip; this being done in a synchronal manner with regard to the motion of the paper and the positions of the printed form of scale thereon and is accomplished electromechanically by solenoids and actuated by current from a local source of current and through a contact in connection with a special shaped wheel for the purpose and in connection with the spring actuated train of gears.

A further object of my invention is to provide means to marginally mark the record in such a manner that at a glance, one may determine as to the relation of any one of the points thermally under the control of the recorder, to the particular record then under scrutiny.

With these and other objects in view my invention consists of the improvements herein described, and disclosed in the drawings which form a part of this specification, and which will be further pointed out in the claims appended hereto.

Figure 6:
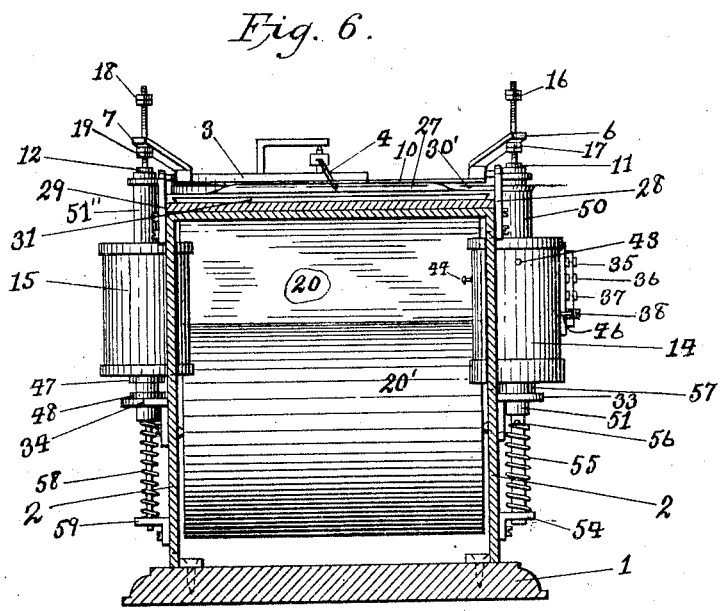
Figure 7:
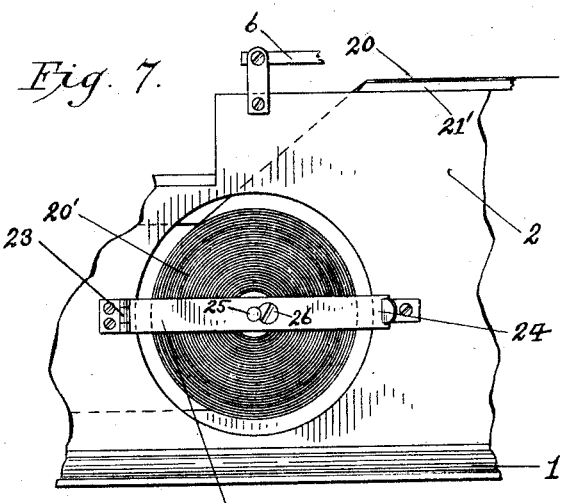
Figure 8:
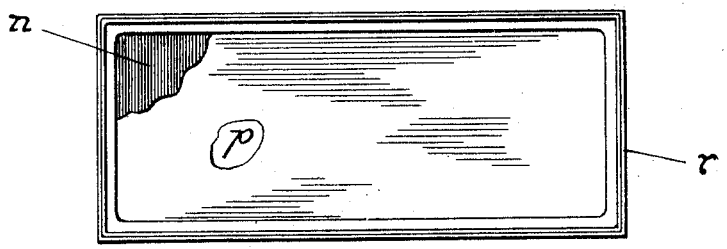
Figure 9:
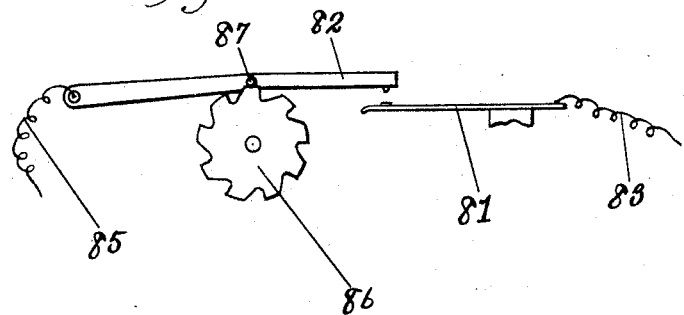

In the drawings which illustrate a suitable embodiment of my invention, Figure 1, is a top, plan view of my instrument and circuits in connection with four thermal-electriccouples. Fig. 2, is a side elevation of same. Figs. 3, and 4, are details of one of the solenoids and its coöperating, closely related parts. Fig. 5, discloses a view of the said solenoid, as the arrows fly at lines 5, 5, in Fig. 3. Fig. 6, is a cross section of my instrument, viewed at cross lines 6, 6, and as the arrows fly in Fig. 1. Fig. 7, shows details of the manner in which the paper roll is related to the instrument and the manner in which it is held in its position, to rotate freely. Fig. 8, shows a frame for holding the marking medium used between the indicator and the paper strip. Fig. 9, discloses the details of the mechanically-actuated, electric-contact with the wire leads connected thereto.

Referring to the drawings in a more particular scrutiny of same, it will be noted that like characters of reference refer to like parts throughout all the figures in the several sheets, and in which 1, is a base preferably of wood; 2, indicates the housings or main structure; the galvanometer 3, with the indicator hand 4, is shown with one end of the said indicator, adapted to travel over the calibrated scale 5; a pair of arms 6 and 7, adapted to fulcrum and work, dependent upon the screws 8 and 9, are joined together by the segment 10, and the extensions of these arms are adapted to be intimately related to the piston armatures 11 and 12, within the solenoids 14 and 15, by means of the stud-screws bearing the jam-nuts 16, 17, 18 and 19. A roll of paper 20′ is shown in the Fig. 2, as within the housing and the paper strip therefrom is shown conducted upward and across a raised portion of the housing 2,—described at 21′—and is designated, and may be traced by the numeral 20. This paper 20, is charted as at 21, to conform to the curvature of the arc described by the segment 10, and likewise the arc described by the travel of the indicator hand 4. A roller 90, operated by the gear 89, and the pinion 88 — in connection with a clock-spring actuated movement, hereinafter further described—in combination with a gravity affected, friction, contact roller 91, serves as means for advancing the paper strip as used. A pair of standards, one of which is seen at 5′, in Fig. 2, serve to hold the scale 5. The paper roll 20′ is held and rotates on and between the center point 32, Fig. 2, and the center point 25, on the gate 22, hinged at 23, and latched at 24, in Fig. 7; an adjustment screw 26, is shown as adapted to closely adjust the last named center point to the spindle within the said paper roll.

The beforementioned solenoids 14, and 15, are arranged on either side of the instrument and are held permanently in place by means of the bracket arms 28, 29, 33 and 34, in combination with the frame of the instrument and the inner or core tubes of the solenoids, and shown at 51, Fig. 3, and at 51″, in Fig. 6. In describing these solenoids and their functions, it will be noted that there is some difference in the arrangements of their outer casings, inasmuch as one casing is permanent in its position, while the other one is adapted to revolve around about the core-tube and the coil; the solenoid having the latter casing will be considered first; in Figs. 3, and 4, the core-tube 51,—supported permanently by the brackets 28, and 33,—is surrounded by a suitable winding of wire 49, and within the limits bounded by suitable coil-ends or washers; a composite casing 14, is shown with its upper portion 50, adapted as an operable bearing on the tube 51, and its lower portion supported in its downward, gravity affected thrust, by the bracket 33, and the intermediate washer 57, and the ratchet wheel 61. The beforementioned armature 11, has an extension at its lower extremity, consisting of a flat strip of metal 52, so formed or twisted as at 53, so that the flat surface of the lower part of this strip will be at an angle of 90 degrees to the flat surface of the upper part; this strip extends downward and through a guide-bracket 54, in such a manner that it may slide therein vertically, but may not turn around about its axis. An annularly coiled wire compression spring 55, is adapted around about this said strip and engages the bracket 54, at one end and a pin 56,—which passes through the strip 52,—at the other end, and serves to exert pressure upward on the said strip and the armature 11, to hold it in its normal position. The casing 51, is shown cut away at 51′, in Fig. 5, and as will be noted by the dotted line position in Fig. 4, this cutting away amounts to a slot on the either side, so as to admit of the introduction of the U shaped, straddle member 60; this member is adapted to pass therethrough and around the flat strip 52, within the core-tube aforementioned, and to semi-rotate within the said slots, operated by the displacement of same, due to the aforementioned twist in the said strip, when in motion; this semi-rotary motion, in this case amounts to a one fourth of a revolution, forward and backward. This U shaped member is adapted to engage with the ratchet wheel 61, by means of a pin, which is seen adjacent to point 60, in Fig. 5, and point 61, in Fig. 4; so that thereby the said ratchet is caused to turn either way, and limited in this action by the motion limitations of the said strip within the said casing 51. This ratchet wheel operably coöperates with a pair of ratchet-pawls 62, which are operably attached to the lower member of the aforesaid casing 14, and are further adapted and controlled to the proper performance of their functions in engaging the ratchet wheel, by means of a pair of tension springs shown at 63, in Fig. 5. The number of the teeth in the said ratchet wheel being even and divisible by four, it must appear obvious that the mechanical arrangements of this part of this mechanism are correct to that extent that the advancement of the said outer casing will be a one fourth of one revolution, in but one continuous direction, for every time the said armature is depressed and released from one extreme to the other of its limited up and down motion, being drawn by magnetism and returned by the aforesaid spring 55.

A series of contact springs, operably related to the aforesaid casing, are best observed in Figs. 3, and 4, and are arranged in pairs, mounted upon an insulation as a base, and are described at 35, 39, 36, 40, 37, 41, 38 and 42, respectively: These springs are operated in single pairs, one at a time, and serially by means of the protuberant members 43, 45, 44, and 46, which are so arranged and distributed around about the said casing, so that each one travels in a plane that will of a necessity bring it into juxtaposition with a pair of springs once for every complete revolution; they may be further described as being spirally distributed and leading each other by 90 degrees around about the said casing and positioned in such a manner that the normal position of the said casing will cause one of the said protuberances to be engaged with a pair of springs as at 46, at all times while the said casing is not in motion. The other solenoid 15, is intended simply as an auxiliary to aid the magnetic pull of the solenoid 14, upon the combination of parts 6, 7, and 10, and needs no further description than to show the spring 58, around about a stem slidable within a bracket 59, as a retrieving spring for the armature 12, while the collars 47, and 48, are for the purpose of preventing the casing from sliding and the tube from being displaced downward respectively. A frame 27, is shown adapted to receive within the space 31, Fig. 6, an additional frame $r$, shown in Fig. 8, and adapted to hold a sheet of ordinary transfer or carbon paper $n$, with an over cover of some thin, tough paper or onion-skin parchment to prevent the stylus on the indicator from becoming clogged with the preparation coming off of the said carbon paper when in contact. This latter frame is adapted to be slidably advanced to bring a fresh portion under the stylus when necessary.

In Fig. 1, I show four thin spring arms, radially arranged as at 30, and shown as connected to the member 50, in Figs. 3, and 4, and carrying stylus figures at 30', and again seen in Fig. 6, in position as at 30' over the edge of the path of travel for the said paper strip, and directly under the portion 10, so that when the said portion 10, is depressed it will engage the thin spring and impress the underlying stylus figure through the carbon paper, upon the edge of the traveling paper strip as will be noted in the margin thereof in Fig. 1. A battery 80, as a source of energy, is shown connected through wire 85, to the contact lever 82, which is operably related to the peculiarly shaped ratchet wheel 86, by means of a pin 87, and as seen is not in contact with its companion anvil contact 81; when in contact therewith, the current continues to flow through wire 83 to the solenoid 14, and although not shown, means are provided to connect the solenoid 15, and include it in series with the said solenoid 14, and in the circuit described as returning by the wire 84.

Diagrammatically, in connection with my instrument in Fig. 2, I show what purports to be four distinct heat-centers or thermo-couples as at 64, 65, 66, and 67, all of which are connected by one side of each to a common wire 68, and to one side of the galvanometer 3; the other side of the galvanometer is connected commonly, by the wire 69, to the aforesaid springs 35, 36, 37, and 38 and the companion contact springs as aforesaid serve to separate this common circuit as at 39, 40, 41, and 42, and the wires 67', 66', 65', and 64', serve to connect the said thermo-couples 67, 66, 65, and 64, with the said springs respectively. In addition to this circuit as described, I have shown diagrammatically in Fig. 1, a form of manually operated, means, to independently observe the temperature from any one of the thermo-couples, at any time without in any way militating against the real functions of the instrument proper; this is done as follows: The circuit wire 69, is cut and the galvanometer end is connected to the operated member of a contact switch, as at 70, and which it will be noted is in a normally closed condition with regard to a member 71, to which the continuation of the circuit 69, is connected, thereby restoring the original condition of the wire 69; the upward contact of the member 70, is secured by the small spiral spring thereunder; the under or anvil contact spring 72, is common to the selective sweep, contact spring 75, and arranged around about said sweep and equidistant from each other, are four contact points, adaptable to make contact with said sweep spring, and connected respectively with each of the thermo-couples by means of the wires 76, 77, 78, and 79, and the wires 64', 65', 66', and 67'; the last named wires appear to run common at the point 39' but this is not the case as will be readily noted by reference to the Fig. 2. Alluding again to the selective feature, for example, let one wish to read the temperature of the area controlled by the couple 66, and assuming that the position of the automatic control is such that the couple 64, is then registering, all that is necessary is to turn the spring 75, to contact-wire 78, and press the key or spring 70; thus you short-circuit the galvanometer on to the circuit of the couple 66, and the release of the key 70, restores the normal condition. The anvil point 73, is for an obvious reason under the spring 72.

The slots 92, in the arms 93, are provided so that the roll 91, may perform its gravity affected function and roll with some force and pressure upon the paper to compress it against the actuating roll 90, in order that the paper may thereby progress. It must appear obvious that a small change in the degree of twist in the member 52, and a change in the number of teeth in the ratchet-wheel, together with additional protuberant extensions on the said casing and a like number of pairs of contact springs, will enlarge the adaptation of this instrument, so that it would take care of more than four stations as shown.

In describing the action of the instrument, I will commence by returning to the aforementioned clock-work which includes a train of gears and clock-spring, and is shown largely diagrammatically at 4' in Fig. 2, and which is connected to the aforementioned wheels 88, and 86, in such a manner that the rate of speeds of the two, will bring about—in the first instance—a relative speed of the roller 90, sufficient to advance the paper strip forward a space equivalent to but one of the graduations thereon, in each five minutes' duration of time; and in the instance of the wheel 86, to so control its speed, that it will rotate to advance but one of its teeth by a given point and so bring the next adjacent tooth to the said same point, all within the aforesaid space of time, to-wit, five minutes. These two motions are so synchronized that a tooth of the wheel 86, will allow of the operation of the contact between lever 82, and contact 81, at the time incident to the passage of a graduated space upon the paper directly under the stylus on the end of the indicator 4. This contact being made and the thermo-couples being in service or action, and all other parts being in position as shown, the couple 64, is being indicated and registered.

In a general résumé of the details of my mechanism and the actual mechanical, detail working of its coöperative parts, we will consider the action of same in so far as it is concerned for the registering of one station only, as to go farther would be but a repetition of the other just viewed. The machine being in action and the couple 64, being energized by heat, the current therefrom travels through the wire 64', to spring 42, thence by contact through spring 38, and common wire 69, to the galvanometer 3, and returns by the common wire 68. This current deflects the galvanometer and the degree of the said deflection may be read upon the scale 5, at any time; the double, balanced indicator 4. extending underneath the member 10, and over the transfer frame and paper $r$, $p$, and $n$, in a position to be depressed and impress a reading on the indicator strip of paper 20. The wheel 86, advancing, allows the lever 82, to make contact with the anvil point 81, and the battery current 80, travels through 85, 82, 81, and 83, to the windings of the two solenoids and returning to the batteries 80, by the wire 84. This current energizes the solenoids to draw their respective armatures downward, and they make nearly a full stroke before the jam nuts 16, and 18, engage the levers 6, and 7, to cause the member 10, to make a record by means of the member 4. In thus doing, the solenoid armature 11, in Fig. 2, and further seen in Figs. 3, and 4, will be at a position such as the lowermost extremity of motion would permit, and which will be the opposite position from that shown, and in the transit from the top to the bottom of this limited motion, the twisted member 52, will have reversely rotated the ratchet-wheel 61, and upon the deënergization of the coils, the armature 11, will return, pulling on the member 52, and it will advance the ratchet wheel back to its original normal position in repose. This will cause an advancement of the casing 14, and will thereby disconnect the springs 38, and 42, and at the same time advance the protuberant member 45, to engage spring 41, to contact with the spring 37, and thus bring the current from the couple 65, to operate the galvanometer. The member 10, being raised to clear the indicator 4, by means of the jam nuts 17, and 18, leaves the galvanometer free to settle to the equilibrium of its forces, and thereby produce an indicated reading, compatible with the thermal conditions of the couple just connected, as aforesaid. The arms 30, with the figures indicating the couples read, are actuated and turned in to position by the casing 14, and the presentation of a figure arm into position over the margin of the paper, is incident to the time of the presentation of a protuberant member under a pair of contact springs to which that particular figure arm 30, relates.

I wish the following addendum considered, as therein are several thoughts that serve to set forth and accentuate some points in the foregoing and when considered therewith, will clearly show the salient features of my invention and those which differentiate it from other prior art. I. A galvanometer which is automatically connected to, and disconnected from thermo-couples, to serially designate the temperature of each area controlling the individual couple, and susceptible of being manually disconnected from any couple then in automatic-connection, and re-connected to any other couple, at will, and without disarrangement of the mechanism and leaving the said mechanism to return,—of its own accord—back to the original, normal position and condition, upon the operator leaving it. II. A pyrometer disposing of the used portion of the record paper strip, and offering a fresh portion, being in continuous motion:—actuated by a clock-spring impulsion,—and in connection therewith, a method whereby an electrical circuit is made continuous at synchronal periods with the presentation of the beforedetermined, proper position of the said paper strip, as presented under the stylus-point of the galvanometer indicator, and a further electro-mechanical means coöperating with said circuit and a suitable source of energy or current generator, to cause an impression of the said indicator-stylus at the position it then assumes; this without disturbing the relative connections between the thermo-couple then in circuit with the galvanometer, but immediately thereafter, the record having been made, a fresh selection, connection therewith, and disconnection of the old circuit is made, and independent,—mechanically—with the said motive force incident to the aforesaid paper strip.

Having thus clearly and concisely related this description with the disclosures of my invention, in such a manner so that to those who are skilled in the art to which it appertains, may successfully make and use same, that which I deem important and wish to protect by Letters Patent follow.

What I claim is:—

1. In an electro-automatically recording pyrometer of the character described, the combination of a galvanometer and a base therefor; a graduated scale operatively connected to said base, a second graduated scale connected to said base, a plurality of thermo-couples electrically connected to said galvanometer, by one side of each respectively; a plurality of electric-contact springs in pairs; means to connect said springs to said galvanometer and said thermo-couples in series, with regard to each individual pair of springs and one of said plurality of thermo-couples respectively and relatively so connected to the said galvanometer; means provided to connect and to disconnect said springs; means for advancing a paper record strip along the top of said base; an indicator hand intimately related to the said galvanometer and free to move along the transverse surface of said paper strip, one end of said indicator hand adapted to pass over the second named scale and the other end of the hand adapted to pass under the first mentioned scale and means electro-mechanically actuated, adapted to bring said indicator hand in to contact with an intermediate marking medium between said paper strip and said hand, to cause a mark or indication to be impressed upon said paper strip for the purpose specified.

2. In an electro-automatically recording pyrometer of the character described, the combination of a galvanometer and a base therefor; a graduated scale operatively connected to said base, and an indicator hand equally balanced and operatively attached to and forming a part of the moving parts of said galvanometer, a second graduated scale attached to said base, one end of said hand passing over said second scale and the other end of the hand passing under the first mentioned scale, a plurality of thermo-couples electrically connected to said galvanometer, by one side of each respectively; a plurality of electric-contact springs in pairs; means to connect said springs to said galvanometer and said thermo-couples in series, with regard to each individual pair of springs and one of said plurality of thermo-couples respectively and relatively so connected to the said galvanometer; means provided to connect and to disconnect said springs automatically and serially to bring each of the said plurality of thermo-couples into actual electrical series connection with the said galvanometer.

3. In an electro-automatically recording pyrometer of the character described, the combination of a galvanometer and a base therefor; a graduated scale operatively connected to said base, an indicator hand equally balanced and operatively attached to and forming a part of the moving parts of said galvanometer, a second graduated scale connected to said base, one end of said hand passing over the last named scale and the other end thereof passing under the first named scale, a plurality of thermo-couples, electrically connected to said galvanometer, by one side of each respectively; a plurality of electric-contact springs in pairs; means to connect said springs to said galvanometer and said thermo-couples in series, with regard to each individual pair of springs and one of said plurality of thermo-couples respectively and relatively so connected to the said galvanometer; a roll of paper, graduated and in strip form, within said base and means for unwinding and advancing said paper continuously over the top of said base and for the purpose, all as substantially shown and fully described.

4. In a recording pyrometer, electro-mechanically actuated and of the character described, the combination of a galvanometer and a base therefor; of a graduated scale, operatively attached to said base, and an indicator hand in connection with said galvanometer, one end of which is adapted to pass under said graduated scale; a second graduated scale permanently attached to said base, the other end of said indicator hand passing over said last mentioned scale, a pair of solenoids; armatures thereto; means whereby said armatures are operatively related and connected to actuate said scale to depress said hand, all as fully shown and described.

5. A recording pyrometer, electrically and mechanically operated and of the character described, including the combination of a galvanometer and a base therefor; of a graduated scale operatively connected to said base, and an indicator hand, equally balanced and operatively attached to and forming a part of the moving parts of the said galvanometer; another graduated scale permanently attached to said base; one end of said hand adapted to pass over the last named scale, and the other end of the indicator hand adapted to pass and operate under the beforementioned operatively attached graduated scale; a pair of solenoids; armatures thereto; means whereby said armatures are operatively related and connected to actuate said scale; a frame operatively connected to said base and arranged directly under said last named scale, and adapted to sustain a marking medium; an over-cover for said marking medium; said frame being adapted as between said indicator hand and the top of said base, all as fully shown and described.

6. An electro-automatically-operating mechanism of the character described, including the combination of a galvanometer and a base therefor; a plurality of thermo-couples electrically connected to said galvanometer, by one side of each respectively; a plurality of electro-contact springs in pairs; means to connect said springs to said galvanometer and said thermo-couples in series, with regard to each individual pair of springs and one of said plurality of thermo-couples respectively and relatively so connected, one set at a time, to the said galvanometer; means mounted within said base for unwinding and advancing a paper record strip continuously over the top of said base; an indicator hand in connection with said galvanometer and adapted to operate freely over a transverse section of the said paper strip; a graduated scale over said hand and operatively attached to said base and adapted to be actuated to depress said hand into contact with said paper strip; means electrical to cause said depression, and means mechanical, whereby one of the aforesaid thermo-couples is electrically connected to said galvanometer during said depression.

7. In an electro-automatic recording pyrometer of the character described, a base therefor; means for moving a paper record strip and advancing it continuously in one straight direction with regard to the said base; a galvanometer with a balanced indicator hand therefor, one end of which is adapted to traverse a transverse course over said paper strip; two graduated scales connected to said base, and disposed with respect to the indicator hand so that one end of the latter operates under one of the scales and the opposite end of the hand operates over the other of said scales, means electromagnetic for depressing said hand to contact with said paper strip and said last named action occurring during a time when one of a plurality of thermo-couples is connected to said galvanometer; means mechanical, and spring actuated, to restore the said hand to a position where it may freely move and at the same time disconnect the thermo-couple last named and connect the next succeeding one to the said galvanometer so that a new force is brought to act upon said indicator hand.

In testimony whereof I have signed these specifications in the presence of two subscribing witnesses.

W. DE H. LEE.

Witnesses:
L. M. GEMMILL,
L. C. DENISON.